United States Patent [19]

Ellis et al.

[11] 4,218,547

[45] Aug. 19, 1980

[54] BLASTING MEDIA AND METHOD OF MANUFACTURE COMPRISING POLYCARBONATE AND ETHYLENE-CARBON MONOXIDE-VINYL ACETATE TERPOLYMER

[75] Inventors: Henry D. Ellis, 7739 National Turnpike, Louisville, Ky. 40214; Lysle I. Benjamen, Bloomfield Hills, Mich.

[73] Assignee: Henry D. Ellis, Louisville, Ky.

[21] Appl. No.: 950,506

[22] Filed: Oct. 11, 1978

[51] Int. Cl.$^2$ .................... C08L 69/00; C08L 23/08
[52] U.S. Cl. .................................................. 525/148
[58] Field of Search ........................................ 525/148

[56] References Cited

U.S. PATENT DOCUMENTS

| 3,431,224 | 3/1969 | Goldblum | 260/13 |
| 3,780,140 | 12/1973 | Hammer | 260/884 |
| 3,801,673 | 4/1974 | O'Connell | 260/873 |

*Primary Examiner*—Carman J. Seccuro
*Attorney, Agent, or Firm*—Reising, Ethington, Barnard, Perry & Brooks

[57] ABSTRACT

In accordance with the invention there is provided a blasting media, particularly useful for deflashing and deburring, consisting of small cylindrical pellets of a resin material containing from 1% to 8% by weight ethylene-carbon monoxide-vinyl acetate terpolymer and the remainder substantially all polycarbonate resin. Further in accordance with the invention, such blasting media is made by simultaneously heating and mixing a mixture of the polycarbonate resin and terpolymer in the proportions specified, to render the mixture molten, extruding the mixture to cylindrical shape and cutting the extruded mixture into pellets.

3 Claims, No Drawings

4,218,547

BLASTING MEDIA AND METHOD OF MANUFACTURE COMPRISING POLYCARBONATE AND ETHYLENE-CARBON MONOXIDE-VINYL ACETATE TERPOLYMER

TECHNICAL FIELD

The subject matter of the present invention is a blasting media particularly useful for deflashing and deburring operations, and a method for making such media.

BACKGROUND ART

Many metal and organic resin components for vehicle engines, machinery, and other mechanical devices require as one of the steps in manufacture, a deflashing or deburring operation. In the case of molded resin parts, such as those made of phenolic or like hard resin, it is principally a matter of removing any flash from the molding operation whereas in the case of machined metal parts it is a matter of removing any burrs left from imperfections in the machining. Such deflashing and deburring operations are especially important for components which are required to seat or mate closely with other components during operation. Valves and valve seats are examples. The objective in the deflashing and deburring operation is to fully remove the flash and burrs without at the same time in any way deteriorating the surface finish of the components. Essential for efficiency is that the deburring and deflashing be accomplished rapidly and at low cost. It has become conventional to perform such deflashing and deburring operations by blasting such components with a blasting media, i.e. by forcefully impinging against the components small, hard pellets. The efficiency of such an operation is dependent on the physical characteristics of the blasting media. That is, the pellets of the blasting media must have a shape and hardness sufficient to effectively remove the flash and burrs but yet not such as to cause, under the force of the impingement, distortion or other deterioration to the surface or surface finish of the components. Still further, the pellets of the blasting media should ideally be extremely tough so that they can withstand repeated cycling—repeated impingements against the components—without significant distortion to their shape, cracking or excessive wear. As in virtually all situations where both hardness and toughness are required, compromise has been necessary. That is, hardness is at the expense of toughness and toughness is at the expense of hardness.

Prior to the present invention it was already known to use a blasting media of organic resin, such as nylon or polycarbonate resin, for deflashing and deburring operations. However, choice of the particular organic resin used has involved the aforesaid compromise, i.e. long media life at the expense of deburring and deflashing effectiveness and vice versa.

DISCLOSURE OF INVENTION

Briefly, what we have discovered is that blasting media formed of polycarbonate resin modified by the addition thereto of from 1% to 8%, and preferably 4%, by weight ethylene-carbon monoxide-vinyl acetate terpolymer, as hereinafter described, provides a greatly extended useful life and yet, surprisingly, without any decrease in deburring and deflashing efficiency or any other sacrifice in useful properties. The greatly increased life of such blasting media, i.e. increased resistance to wear, permanent deformation from impact, cracking, or other deterioration, stems from the increased toughness imparted by the terpolymer, which increased toughness is apparently, and as expected, accompanied by some decrease in hardness, as compared with blasting media formed entirely of polycarbonate resin. Hence, it would be further expected, in accordance with conventional compromises or "swap-offs" between desired physical properties as aforesaid, that the increased durability of the media would be accompanied by a decrease in deflashing and deburring efficiency which is conventionally considered as a function of the hardness of the media. But such is not the case with respect to the blasting media of the present invention. That is, the increased durability is not accompanied by a decrease in deburring and deflashing efficiency, no matter there may be a decrease in the hardness of the media. Having made the discovery, explanation has been sought for the anomaly and it is theorized that the explanation resides in the excellent mechanical hysteresis characteristics of the blasting media.

Despite a significant difference between the softening temperature of the polycarbonate resin and that of the terpolymer, and despite the relatively low decomposition temperature of the terpolymer, a uniform stable molten mixture between them can be accomplished such that the mixture can be extruded and cut into cylindrical pellets thereby to manufacture the media of the present invention, all as hereinafter further described.

BEST MODE FOR CARRYING OUT THE INVENTION

Starting Materials for the Practice of the Invention

The Polycarbonate Resin

The polycarbonate resin we have used in the practice of the present invention is that which is well known in the organic resin art and amply described in the literature as the thermoplastic polymer derived from the condensation reaction between bisphenol A and phosgene. Such polycarbonate resin is currently marketed in pellet form by, for example, the Mobay Chemical Company of Pittsburgh, Pa. and by General Electric Company of Schnectady, N.Y., the latter under its trademark "Lexan". It is preferred that the polycarbonate resin used for the practice of the invention contain no fillers—though it will be understood that the polycarbonate can, without any adverse effect as to the present invention, contain minor additions of coloring agents, antioxidents, stabilizers, etc. Such polycarbonate resin has a softening range of from about 300° F. to 400° F. That is, the polycarbonate resin commences to soften at approximately 300° F. and becomes most easily extrudable at approximately 400° F.

The Terpolymer

The ethylene-carbon monoxide-vinyl acetate terpolymer we have used in the practice of the invention is one having as its monomer ratio approximately 26% by weight vinyl acetate, approximately 13% by weight carbon monoxide, and the balance ethylene, and having a molecular weight upwards of about 250,000. Such terpolymer has a softening temperature well below that of the polycarbonate resin and when heated by itself, commences to decompose, liberating acetic acid, at temperatures less than or within the softening temperature range of polycarbonate resin. Ethylene-carbon monoxide-vinyl acetate terpolymers are fully disclosed in U.S. Pat. No. 3,780,140, assigned to E. I. DuPont de Nemours & Company of Wilmington, Del., and are currently marketed by DuPont under its trademark "Elvaloy" in pelletized solid form, excellent for the practice of the present invention.

Processing

The blasting media is preferably manufactured by extruding a heat-softened mixture of the polycarbonate resin and terpolymer, in the proportions specified, to cylindrical shaped rods and then cutting the rods into pellets. The following more detailed description will serve to illustrate.

First, the polycarbonate resin in pellet form is dried by heating the pellets to about 250° F. for about four hours. Then the dried pellets are fed into the heating barrel of a conventional auger-fed extruder and simultaneously there is metered into the extruder, at the same location, the solid terpolymer in the proportion required to provide the desired mixture, i.e. from 1% to 8%, and preferably 4%, by weight terpolymer. The barrel is heated to approximately 480° F. such that as the mixture is conveyed through the barrel by the auger it is progressively heated to a temperature of about 400° F. by the time it reaches the extrusion die. The terpolymer rapidly softens and becomes mixed with the polycarbonate, as the polycarbonate softens, by the mixing action of the auger and apparently because the mixing occurs rapidly, with the terpolymer dissolving into the polycarbonate, there is no significant amount of decomposition of the terpolymer no matter it is heated to above the temperature at which the terpolymer by itself would commence to decompose. Hency, the polycarbonate—terpolymer mixture reaches the die it is amply mixed and amply heat-softened for extrusion with minimal, if any, decomposition of the terpolymer. The extrusion die can be of conventional construction, with a plurality of parallel, cylindrical openings for extrusion of the material into cylindrical rods, the diameter of the openings of course being the diameter desired for the rods.

As the extruded rods of the mixture exit from the extruding die a rotating knife is used to cut the rods into cylindrical pellets of the desired length. Such apparatus for making cut extruded pellets can be of generally conventional construction as well known in the plastics forming art.

Characteristics of the Blasting Media

The resulting blasting media consists of small cylindrical pellets of the mixture described.

The blasting media should preferably have a size of from about 0.0025 to 0.0075 inches, and with the length and the diameter preferably being of the same dimension.

The blasting media pellets of the mixture have a hardness somewhat less than that of polycarbonate resin and a toughness greater than that of polycarbonate resin. But no matter the lesser hardness, the effectiveness of the blasting media in deburring and deflashing operations is equal to that of blasting media formed of 100% polycarbonate resin. Yet, by reason of the inclusion of the terpolymer in the proportions specified, there is a substantial increase in the durability and hence in the useful life of the media. That is, the media is, by reason of its toughness, more resistant to fracture and to wear and hence better withstands reduction in size from repeated cycling against the workpieces.

It is theorized that the effectiveness—the excellent performance—of the media in deburring and deflashing operations is because of a low mechanical hysteresis to the end that more of the energy imparted to the media in giving it velocity toward the workpiece is, in turn, imparted to the workpiece by the media.

But whatever the theory, by way of the present invention there is provided a blasting media which has a substantially increased useful life and yet without reduction in deburring and deflashing efficiency.

It will be understood that while the invention has been described in its particulars with reference to preferred embodiments, various changes may be made within the scope of the claims which follow.

What is claimed is:

1. Blasting media consisting of small pellets of a resin material containing from 1% to 8% by weight vinyl acetate-carbon monoxide-ethylene terpolymer and the remainder substantially all polycarbonate resin.

2. Blasting media as set forth in claim 1 wherein said resin material contains 4% by weight of said terpolymer.

3. A method for making the blasting media set forth in claim 1, said method comprising heating a mixture of the polycarbonate resin and terpolymer, in the proportions specified, to about 400° F. as it is being mixed, extruding the mixture to cylindrical shape and cutting said extruded mixture into cylindrical pellets.

* * * * *